United States Patent
Matsumoto et al.

(10) Patent No.: US 11,782,270 B2
(45) Date of Patent: Oct. 10, 2023

(54) HEAD-UP DISPLAY, HEAD-UP DISPLAY SYSTEM, AND MOBILE BODY

(71) Applicant: KYOCERA Corporation, Kyoto (JP)

(72) Inventors: Takuya Matsumoto, Kusatsu (JP); Hideyuki Inoue, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/269,584

(22) PCT Filed: Aug. 26, 2019

(86) PCT No.: PCT/JP2019/033324
§ 371 (c)(1),
(2) Date: Feb. 19, 2021

(87) PCT Pub. No.: WO2020/045350
PCT Pub. Date: Mar. 5, 2020

(65) Prior Publication Data
US 2021/0311306 A1    Oct. 7, 2021

(30) Foreign Application Priority Data

Aug. 29, 2018 (JP) ................................. 2018-160685

(51) Int. Cl.
*G02B 27/01* (2006.01)
*H04N 13/327* (2018.01)
(Continued)

(52) U.S. Cl.
CPC .......... *G02B 27/0101* (2013.01); *B60R 1/025* (2013.01); *G02B 30/20* (2020.01);
(Continued)

(58) Field of Classification Search
CPC ..... G06F 3/013; G02B 27/01; G02B 27/0101; G02B 30/20; G02B 2027/0138;
(Continued)

(56) References Cited

U.S. PATENT DOCUMENTS

| 10,820,795 | B1* | 11/2020 | Weise | G02B 27/0179 |
| 2012/0050138 | A1* | 3/2012 | Sato | G02B 27/01 345/4 |

(Continued)

FOREIGN PATENT DOCUMENTS

| JP | 2002-005656 A | 1/2002 |
| WO | 2018/105533 A1 | 6/2018 |

*Primary Examiner* — Nitin Patel
*Assistant Examiner* — Cory A Almeida
(74) *Attorney, Agent, or Firm* — Studebaker & Brackett PC

(57) ABSTRACT

A head-up display includes a display device and an optical system. The display device includes a display panel, an input unit, a memory, and a controller. The display panel is configured to display an image. The input unit is configured to receive calibration information indicating a position of a calibration object and first position information indicating positions of user's eyes based on an image capturing device. The memory is configured to store the calibration information. The optical system is configured to allow a user to visually recognize a virtual image plane, which is a virtual image of the image displayed on the display panel, by reflecting image light emitted corresponding to the image toward the user's eyes. The controller is configured to convert the first position information into second position information indicating the positions of the eyes based on the virtual image plane by using the calibration information.

5 Claims, 13 Drawing Sheets

(51) Int. Cl.
  *G02B 30/20*   (2020.01)
  *B60R 1/02*   (2006.01)
  *G09G 5/38*   (2006.01)

(52) U.S. Cl.
  CPC ............. *G09G 5/38* (2013.01); *H04N 13/327* (2018.05); *B60K 2370/1529* (2019.05); *B60K 2370/31* (2019.05); *G02B 2027/0138* (2013.01); *G02B 2027/0187* (2013.01)

(58) Field of Classification Search
  CPC .......... G02B 2027/0187; H04N 13/327; B60R 1/025; G09G 5/38; B60K 2370/1529; B60K 2370/31
  See application file for complete search history.

(56) References Cited

U.S. PATENT DOCUMENTS

| | | | |
|---|---|---|---|
| 2015/0226965 A1* | 8/2015 | Kim .................. | G02B 30/30 359/462 |
| 2016/0085301 A1* | 3/2016 | Lopez ................ | G06F 3/012 345/156 |
| 2019/0265788 A1* | 8/2019 | Yosha ................ | G02B 27/0093 |
| 2020/0228791 A1 | 7/2020 | Kusafuka et al. | |

\* cited by examiner

HEAD-UP DISPLAY, HEAD-UP DISPLAY SYSTEM, AND MOBILE BODY

CROSS-REFERENCE TO RELATED APPLICATION

This application claims priority to Japanese Patent Application No. 2018-160685, which was filed on Aug. 29, 2018, the contents of which are incorporated herein by reference in its entirety.

TECHNICAL FIELD

The present disclosure relates to a head-up display, a head-up display system, and a mobile body.

BACKGROUND

In a related art, known is a position detecting device that accurately calculates a position of a target by detecting deviation of an optical axis from a traveling direction of a vehicle in an image capturing device (refer to Japanese Unexamined Patent Publication JP-A 2002-5656 (Patent Literature 1)). In a head-up display that projects image light toward positions of eyes of a user in the vehicle, it is required to accurately detect the positions of the eyes of the user.

CITATION LIST

Patent Literature

Patent Literature 1: Japanese Unexamined Patent Publication JP-A 2002-5656

SUMMARY

A head-up display of the disclosure includes a display device and an optical system. The display device includes a display panel, an input unit, a memory, and a controller. The display panel is configured to display an image. The input unit is configured to receive calibration information indicating a position of a calibration object and first position information indicating positions of user's eyes based on an image capturing device. The memory is configured to store the calibration information. The optical system is configured to allow a user to visually recognize a virtual image plane, which is a virtual image of the image displayed on the display panel, by reflecting image light emitted corresponding to the image toward the user's eyes. The controller is configured to convert the first position information into second position information indicating the positions of the eyes based on the virtual image plane by using the calibration information.

A head-up display system of the disclosure includes an image capturing device and a head-up display. The head-up display includes a display device and an optical system. The display device includes a display panel, an input unit, a memory, and a controller. The display panel is configured to display an image. The input unit is configured to receive calibration information indicating a position of a calibration object and first position information indicating positions of user's eyes based on the image capturing device. The memory is configured to store the calibration information. The optical system is configured to allow a user to visually recognize a virtual image plane, which is a virtual image of the image displayed on the display panel, by reflecting image light emitted corresponding to the image toward the user's eyes. The controller is configured to convert the first position information into second position information indicating the positions of the eyes based on the virtual image plane by using the calibration information.

A mobile body of the disclosure includes a head-up display. The head-up display includes a display device and an optical system. The display device includes a display panel, an input unit, a memory, and a controller. The display panel is configured to display an image. The input unit is configured to receive calibration information indicating a position of a calibration object and first position information indicating positions of user's eyes based on an image capturing device. The memory is configured to store the calibration information. The optical system is configured to allow a user to visually recognize a virtual image plane, which is a virtual image of the image displayed on the display panel, by reflecting image light emitted corresponding to the image toward the user's eyes. The controller is configured to convert the first position information into second position information indicating the positions of the eyes based on the virtual image plane by using the calibration information.

DETAILED DESCRIPTION

It is desirable that an image capturing device accurately detects positions of user's eyes without obstructing a user from visually recognizing a virtual image of an image projected by a head-up display.

The disclosure provides a head-up display, a head-up display system, and a mobile body which are capable of allowing a user to visually recognize an appropriate virtual image.

Hereinafter, one embodiment of the disclosure will be described with reference to the drawings. The drawings used in the following descriptions are schematic, and dimensional ratios on the drawings do not necessarily coincide with the actual ones.

Figure 1:
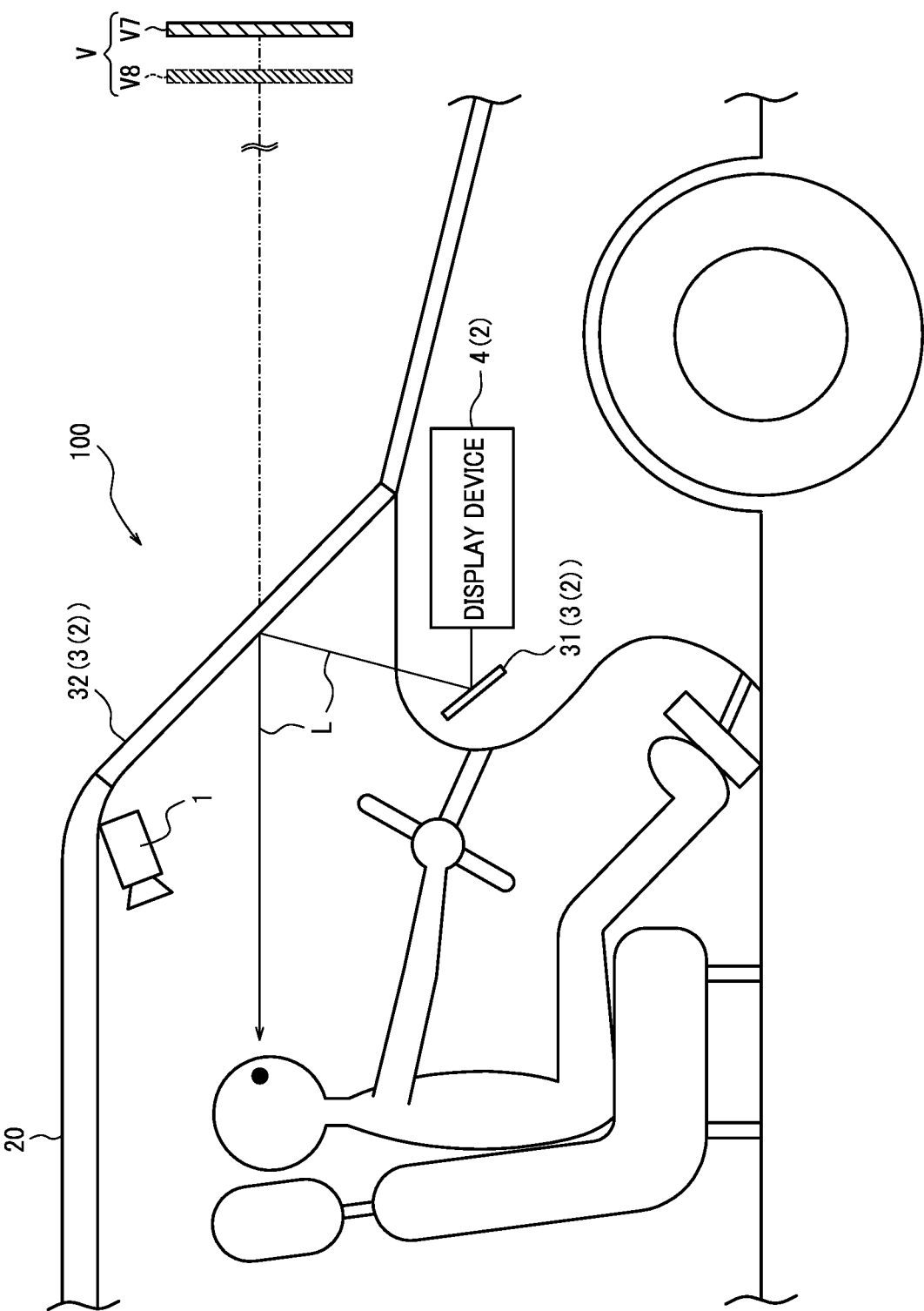
FIG. 1 is a diagram illustrating an example of a mobile body on which a head-up display system is mounted.

As illustrated in FIG. 1, a head-up display system 100 according to the embodiment of the disclosure includes an image capturing device 1 and a head-up display (HUD) 2. The head-up display system 100 may be mounted on a mobile body 20.

The "mobile body" in the disclosure includes a vehicle, a ship, and an aircraft. The "vehicle" in the disclosure includes an automobile and an industrial vehicle, but is not limited thereto and may include a railroad vehicle, an everyday vehicle, and a fixed-wing aircraft traveling on a runway. The automobile includes a passenger vehicle, a truck, a bus, a motorcycle, and a trolley bus, but is not limited thereto and may include other vehicles traveling on the road. The industrial vehicle includes an industrial vehicle for agriculture and construction. The industrial vehicle includes a forklift and a golf cart, but is not limited thereto. The industrial vehicle for agriculture includes a tractor, a cultivator, a transplanter, a binder, a combine, and a lawnmower, but is not limited thereto. The industrial vehicle for construction includes, a bulldozer, a scraper, a shovel car, a crane vehicle, a dump truck, and a road roller, but is not limited thereto. The vehicle includes vehicles that run by human power. The classification of the vehicle is not limited to the above-description. For example, the automobile may include the industrial vehicle that can travel on the road and may include the same vehicle in a plurality of classifications. The ship in the disclosure includes a marine jet, a boat, and a tanker. The aircraft in the disclosure includes a fixed-wing aircraft and a rotary-wing aircraft.

The image capturing device 1 may include, for example, a charge coupled device (CCD) image capturing element or a complementary metal oxide semiconductor (CMOS) image capturing element.

The image capturing device 1 is arranged so that a user's face is positioned on a subject side of the image capturing device 1. The image capturing device 1 may be arranged at a position deviating from the front of the user's face so that an image capturing range includes the user's face. When the head-up display system 100 is mounted on the mobile body 20, the image capturing device 1 may be mounted on a rearview mirror. The image capturing device 1 may be mounted on, for example, a cluster in an instrument panel. The image capturing device 1 may be mounted on a center panel. The image capturing device 1 may be mounted on a supporting portion of a steering wheel, which is arranged at a center of the steering wheel and is adjustably fixed and mounted on the mobile body 20.

The image capturing device 1 is configured to detect a position of a target. For example, the image capturing device 1 is configured to detect a position of at least one of a left eye (a first eye) and a right eye (a second eye) of the user in a first coordinate system. The first coordinate system is a coordinate system based on the image capturing device 1. In the first coordinate system, a direction of an optical axis OX of the image capturing device 1 is defined as a Z direction. An origin of the first coordinate system may be, for example, a predetermined position of the image capturing device 1. The predetermined position of the image capturing device 1 may be, for example, a center of an image capturing surface perpendicular to the optical axis OX. The image capturing device 1 is configured to detect a position of a calibration object. The calibration object may be eyes of a calibration operator.

The image capturing device 1 is configured to output first position information indicating positions of user's eyes in the first coordinate system to a display device 4. The image capturing device 1 is configured to output calibration position information indicating the position of the calibration object in the first coordinate system to the display device 4. The image capturing device 1 may be configured to output the first position information and the calibration position information to the display device 4 via a communication network such as a wired network, a wireless network, and a CAN (Controller Area Network).

The image capturing device 1 may be configured to detect the position of at least one of the left eye and the right eye from a captured image including an image of the face of the user of the camera. Specifically, the image capturing device 1 is configured to be able to store in advance correspondence information in which a combination of a position of the user's face, a direction of the user's face, and a size of the user's face on the captured image is associated with the positions of the user's eyes in the first coordinate system. The correspondence information can be determined, for example, by experiment or simulation. The correspondence information may be stored as, for example, a lookup table. The image capturing device 1 is configured to be able to detect the position of the user's face, the direction of the user's face, and the size of the user's face on the captured image. For example, a method using pattern matching and a method for extracting a feature point of the user on the captured image can be adopted for detecting the face and the eyes. The image capturing device 1 is configured to be able to extract the positions of both eyes of the user in the first coordinate system, which can correspond to the combination of the position of the user's face, the direction of the user's face, and the size of the user's face on the detected captured image from the correspondence information. The image capturing device 1 is configured to be able to detect the extracted position as the positions of both eyes of the user in the first coordinate system.

The image capturing device 1 is configured to be able to detect the positions of the user's eyes in the direction of the optical axis OX by a well-known method. For example, the image capturing device 1 is configured to be able to detect a distance up to the user's eyes in the direction of the optical axis OX based on a focal point distance and blur on the image. For example, the image capturing device 1 is configured to be able to detect the position of the user's face in the direction of the optical axis OX by a ToF (Time of Flight) method using infrared rays, and to detect the positions of the user's eyes as described above based on the position of the user's face. For example, the image capturing device 1 is configured to calculate a distance by a comparison between sizes of a camera angle of view and a target.

The HUD 2 includes an optical system 3 and the display device 4. The optical system 3 may include one or more optical elements 31 and an optical member 32.

The one or more optical elements 31 are configured to reflect image light emitted from the display device 4 toward a predetermined region of the optical member 32. The predetermined region is a region in which the image light reflected in the predetermined region is directed toward the user's eyes. The predetermined region can be determined by a direction of the user's eyes with respect to the optical member 32 and an incident direction of the image light on the optical member 32. Each of the one or more optical elements 31 may be a mirror or a lens. When the optical element 31 is the mirror, for example, the mirror may be a concave mirror. In FIG. 1, one or more optical elements 31 are configured to be displayed as one mirror. However, the disclosure is not limited thereto, and the one or more optical elements 31 may be configured by combining one or more mirrors, lenses, and other optical elements.

The optical member 32 is configured to reflect the image light emitted from the display device 4 and reflected by the one or more optical elements 31 toward the left eye and the right eye of the user. For example, a windshield of the mobile body 20 may also be used as the optical member 32. Therefore, the HUD 2 is configured to allow the light emitted from the display device 4 to advance up to the left eye and the right eye of the user along an optical path L. The user can visually recognize the light arriving along the optical path L as a virtual image V.

Figure 2:
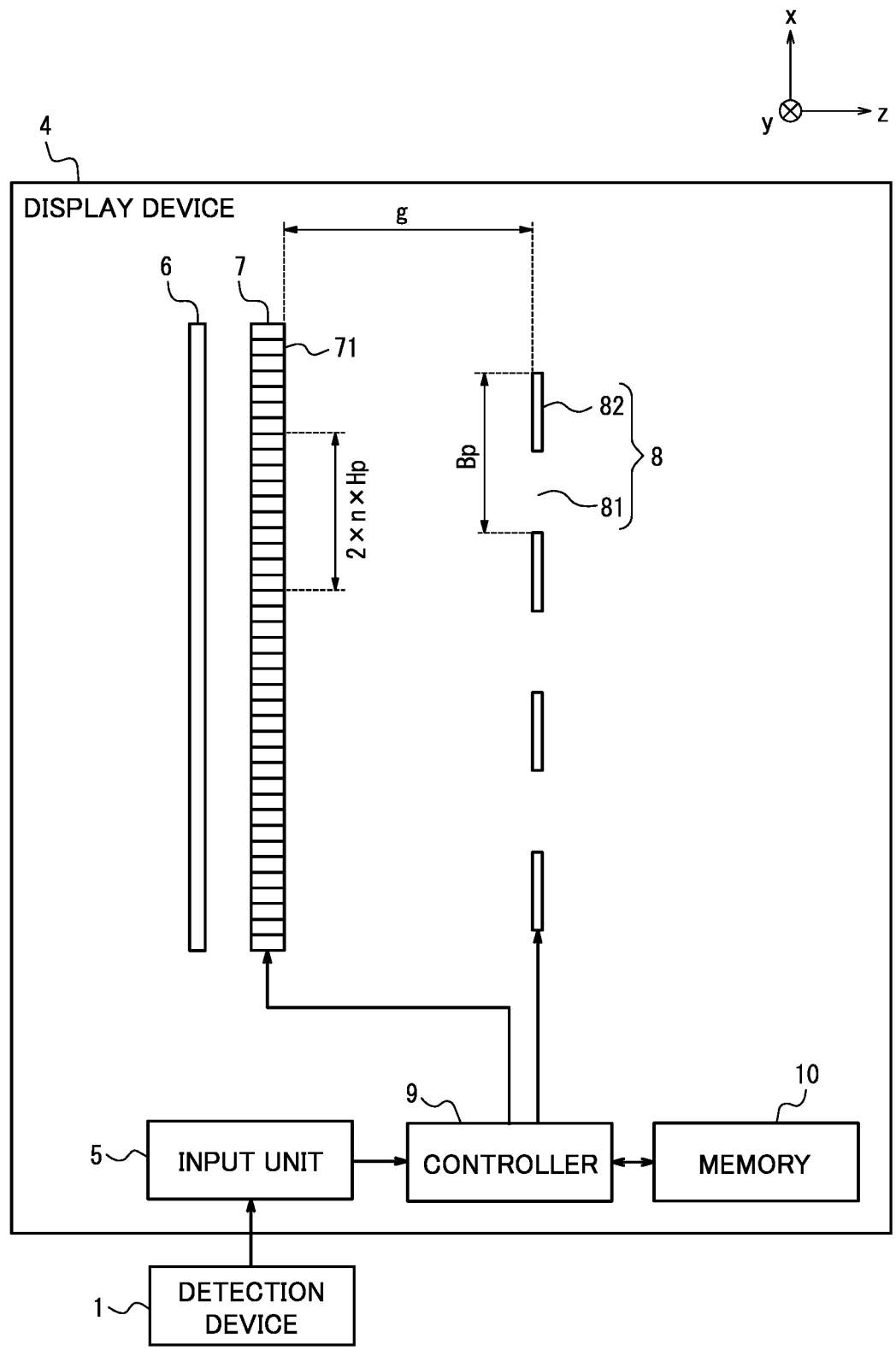
FIG. 2 is a diagram illustrating a schematic configuration of a display device illustrated in FIG. 1.

As illustrated in FIG. 2, the display device 4 can include an input unit 5, an irradiator 6, a display panel 7, a parallax barrier 8 as an optical element, a controller 9, and a memory 10. When the display device 4 is mounted on the mobile body 20, the display device 4 may be mounted on a cluster of the mobile body 20.

The input unit 5 is configured to receive the first position information indicating the positions of the user's eyes in the first coordinate system detected by the image capturing device 1. The input unit 5 is configured to receive the calibration position information indicating the position of the calibration object in the first coordinate system detected by the image capturing device 1. The input unit 5 may be configured to receive at least one of first arrangement information, second arrangement information, and third arrangement information which will be described later.

The irradiator 6 is configured to be able to planarly irradiate the display panel 7. The irradiator 6 may include a light source, a light guide plate, a diffusion plate, and a diffusion sheet. The irradiator 6 is configured to emit irradiation light by the light source and to uniformize the irradiation light in a surface direction of the display panel 7 by the light guide plate, the diffusion plate, and the diffusion sheet. The irradiator 6 is configured to be able to emit the uniform light toward the display panel 7.

As the display panel 7, for example, a display panel such as a transmissive liquid crystal display panel can be adopted. The display panel 7 is not limited to the transmissive liquid crystal panel, and another display panel such as organic EL can be used. When a self-luminous type display panel is used as the display panel 7, the display device 4 may not include the irradiator 6. The display panel 7 will be described as a liquid crystal panel.

Figure 3:
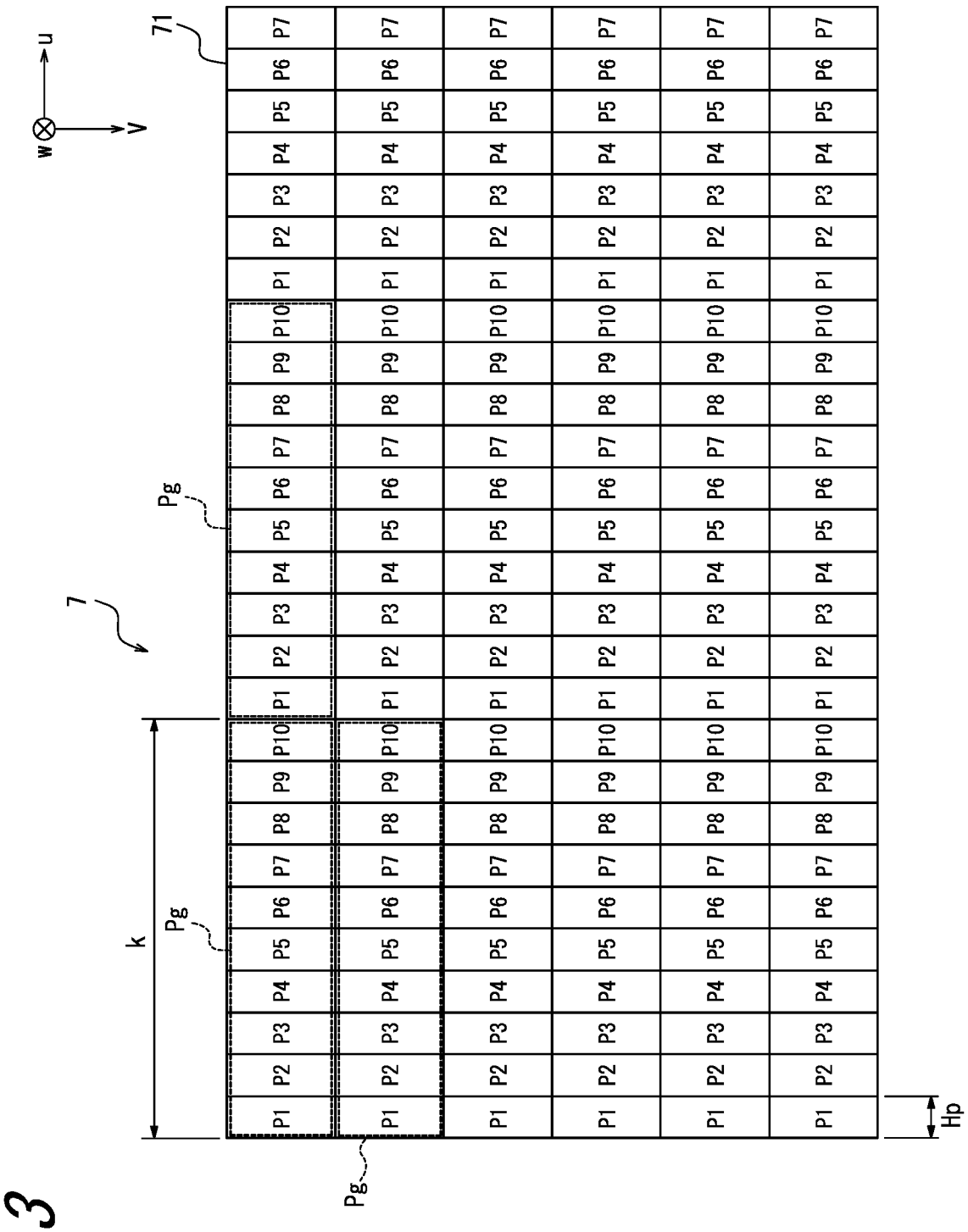
FIG. 3 is a diagram illustrating an example in which a display panel illustrated in FIG. 2 is viewed from a depth direction.

As illustrated in FIG. 3, the display panel 7 is configured to include a plurality of partition regions on an active area 71 formed in a planar shape. The active area 71 is configured to display a parallax image. The parallax image includes a left eye image (a first image) and a right eye image (a second image) having a parallax with respect to the left eye image which will be described later. The partition region is a region partitioned by a grid-shaped black matrix. The partition region is a region partitioned in a first direction and a second direction orthogonal to the first direction. A direction orthogonal to the first and second directions is referred to as a third direction. The first direction may be referred to as a horizontal direction. The second direction may be referred to as a vertical direction. The third direction may be referred to as a depth direction. However, the first direction, the second direction, and the third direction are not limited thereto, respectively. In FIGS. 3, 4, 6 and 7, the first direction is represented as a u-axis direction, the second direction is represented as a v-axis direction, and the third direction is represented as a w-axis direction.

Each of the partition regions corresponds to one sub-pixel. Therefore, the active area 71 includes a plurality of sub-pixels arranged in a grid shape along the horizontal direction and the vertical direction.

Each of the sub-pixels corresponds to, for example, any one of the colors red (R), green (G), and blue (B). The three sub-pixels R, G, and B form one pixel as a set. One pixel can be referred to as one picture element. The horizontal direction is, for example, a direction in which a plurality of sub-pixels forming one pixel are lined up. The vertical direction is, for example, a direction in which the sub-pixels having the same color are lined up.

As described above, the plurality of sub-pixels arranged in the active area 71 form a sub-pixel group Pg. The sub-pixel group Pg is arranged repeatedly in the horizontal direction. The sub-pixel group Pg is also repeatedly arranged in the vertical direction. The sub-pixel group Pg includes the sub-pixels in a predetermined row and column. Specifically, the sub-pixel group Pg includes (2×n×b) pieces of the sub-pixels P1 to P(2×n×b) in which the sub-pixel of a (b) row in in the vertical direction and the sub-pixels of (2×n) columns in the horizontal direction are consecutively arranged. In the example illustrated in FIG. 3, n is 5 and b is 1. In the active area 71, the sub-pixel group Pg including 10 pieces of the sub-pixels P1 to P10, in which the sub-pixel of one row in the vertical direction and the sub-pixels of 10 columns in the horizontal direction are consecutively arranged, is arranged. In the example illustrated in FIG. 3, a part of the sub-pixel groups Pg is denoted by a reference sign. An image pitch k, which is a length in the horizontal direction of the sub-pixel group Pg, is represented as k=2×n×Hp when a length in the horizontal direction of one sub-pixel is defined as Hp.

The sub-pixel group Pg is a minimum unit with which the controller 9 which will be described later performs control for displaying an image. The sub-pixels P1 to P(2×n×b) including the same identification information of all the sub-pixel groups Pg are simultaneously controlled by the controller 9. For example, when the controller 9 switches the image to be displayed on the sub-pixel P1 from the left eye image to the right eye image, the image to be displayed on the sub-pixel P1 in all the sub-pixel groups Pg can be simultaneously switched from the left eye image to the right eye image.

As illustrated in FIG. 2, the parallax barrier 8 extends along the active area 71. The parallax barrier 8 is positioned away from the active area 71 at a predetermined distance (gap) g. The parallax barrier 8 may be positioned on an opposite side of the irradiator 6 with respect to the display panel 7. The parallax barrier 8 may be positioned on a side of the display panel 7 close to the irradiator 6.

Figure 4:
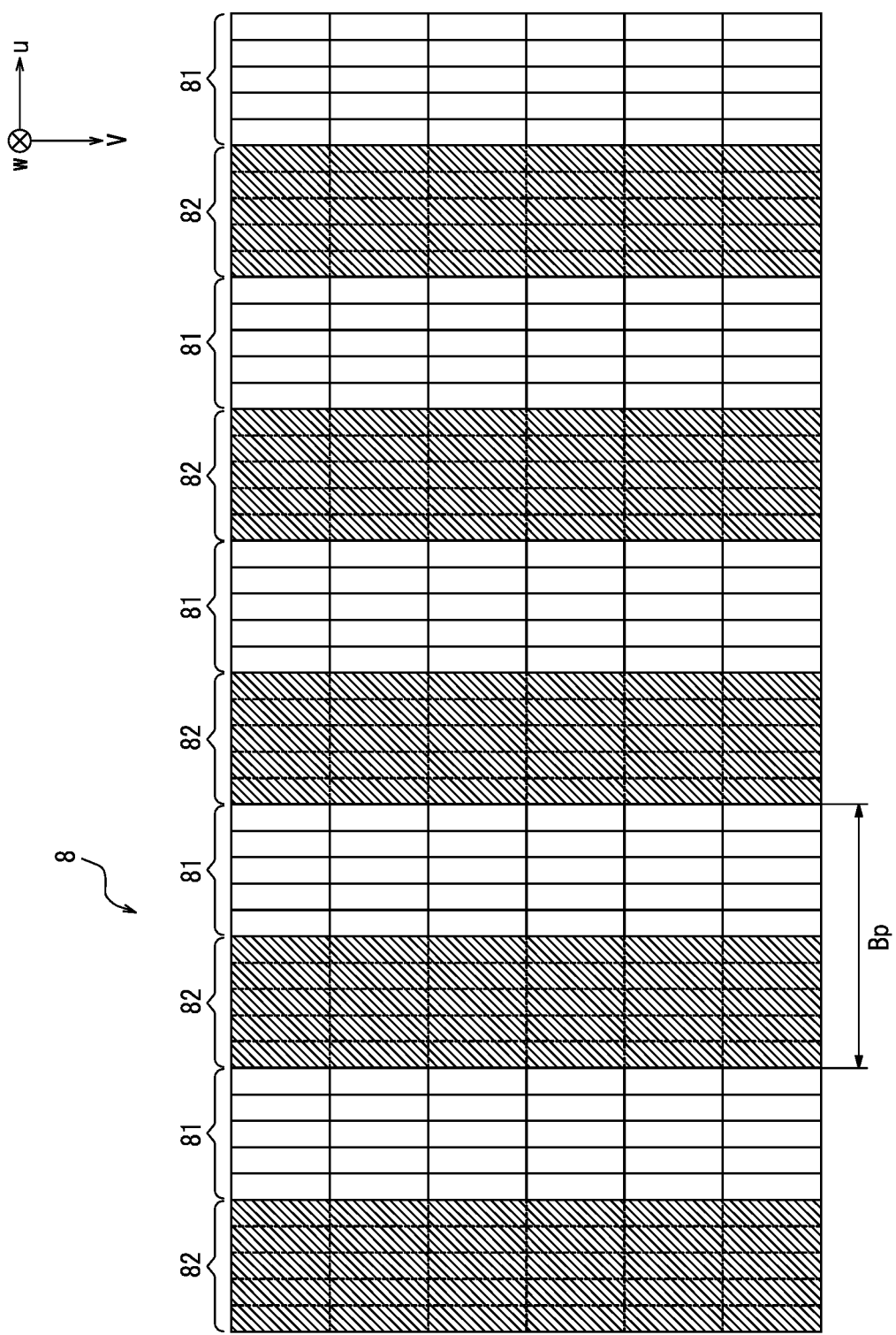
FIG. 4 is a diagram illustrating an example in which a parallax barrier illustrated in FIG. 2 is viewed from the depth direction.

As illustrated in FIG. 4, the parallax barrier 8 is configured to define a light beam direction which is a propagation direction of the image light emitted from the sub-pixel. Specifically, as illustrated in FIG. 4, the parallax barrier 8 includes a plurality of light-transmitting regions 81 and a plurality of dimming regions 82. The light-transmitting region 81 is a portion for transmitting light incident on the parallax barrier 8. The light-transmitting region 81 may be configured to transmit the light with a transmittance of a first predetermined value or more. The first predetermined value is greater than a second predetermined value which will be described later. The dimming region 82 may transmit the light at a transmittance of the second predetermined value or less. The dimming region 82 extends in a predetermined direction, and defines the light-transmitting region 81 extending in a predetermined direction between the dimming regions 82 adjacent to each other. The predetermined direction may be, for example, the vertical direction. The light-transmitting region 81 and the dimming region 82 are repeatedly and alternately arranged in a direction orthogonal to the predetermined direction.

For example, the dimming region 82 may be configured by a light-shielding surface. The light-transmitting region 81 may be configured by an opening defined by the light-shielding surface. In such a configuration, the first predetermined value may be, for example, 100% or may be a value close to 100%. The second predetermined value may be, for example, 0% or may be a value close to 0%. The first predetermined value can be defined as a relative ratio to the second predetermined value.

The parallax barrier 8 may be formed of a liquid crystal shutter. The liquid crystal shutter can control the light transmittance according to an applied voltage. The liquid crystal shutter is formed of a plurality of pixels, and may control the light transmittance in each pixel. In such a configuration, as a ratio of the second predetermined value to the first predetermined value is lower, the configuration is better. In one example, the ratio of the second predetermined value to the first predetermined value can be set to 1/100. In another example, the ratio of the second predetermined value to the first predetermined value can be set to 1/1000.

Figure 5:
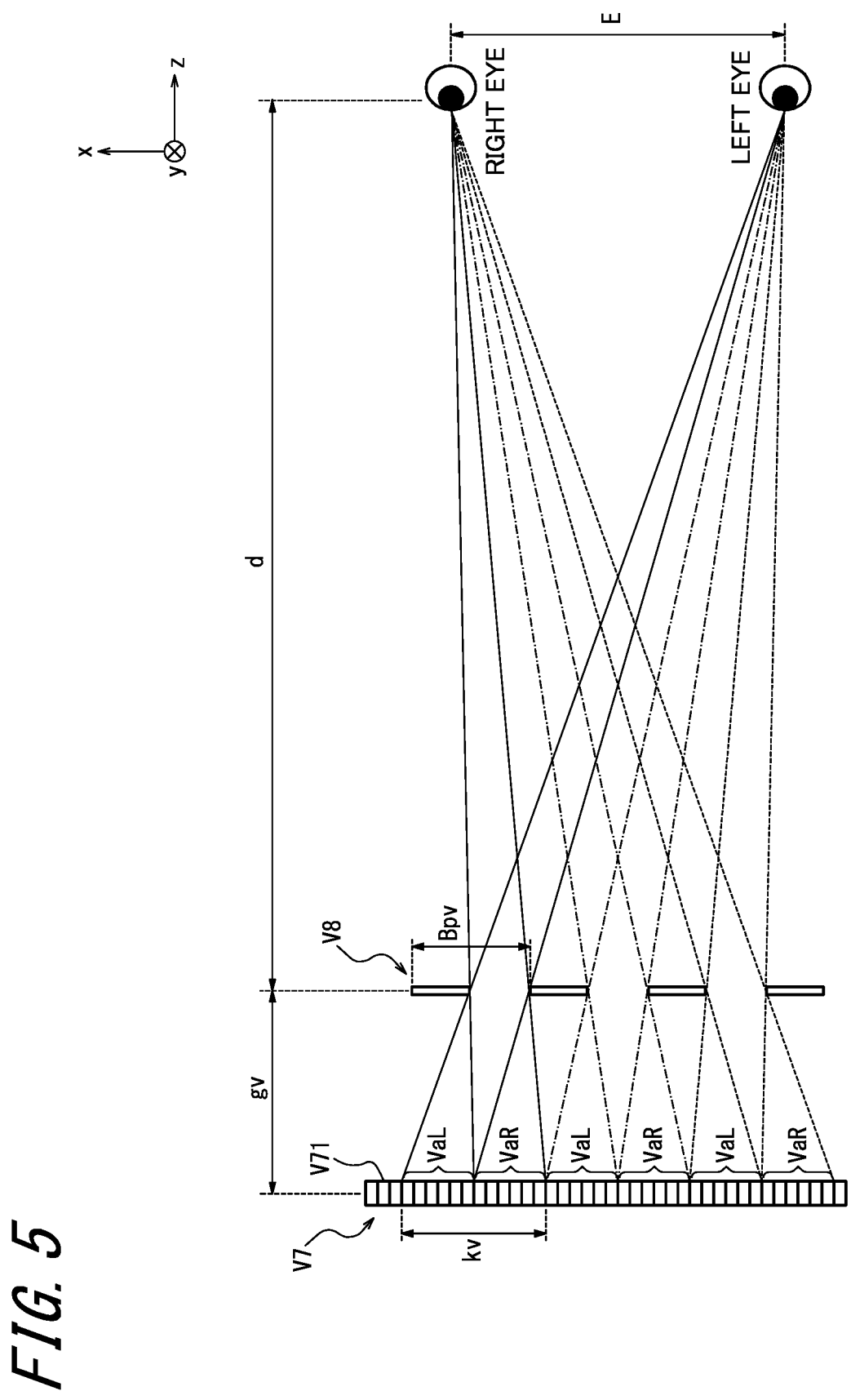
FIG. 5 is a diagram illustrating a relationship between a virtual image and user's eyes illustrated in FIG. 1.

Part of the image light emitted from the active area 71 of the display panel 7 is transmitted through the light-transmitting region 81, and reaches the optical member 32 via the one or more optical elements 31. The image light reaching the optical member 32 is reflected by the optical member 32 and reaches the user's eyes. Accordingly, the user's eyes recognize a first virtual image V7, which is a virtual image of the image displayed in the active area 71, in the front of the optical member 32. In the disclosure, the front is a direction of the optical member 32 when viewed from the user. The front is a direction in which the mobile body 20 normally moves. Therefore, as illustrated in FIG. 5, the user apparently recognizes the image as if the direction of the image light from the first virtual image V7 is defined via a second virtual image V8 which is a virtual image of the parallax barrier 8.

As such, the user apparently recognizes the image as if the first virtual image V7 is visually recognized via the second virtual image V8, and the second virtual image V8 which is the virtual image of the parallax barrier 8 actually does not exist. However, hereinafter, the second virtual image V8 apparently exists at a position where the virtual image of the parallax barrier 8 is formed, and is described as being considered as defining the image light from the first virtual image V7.

Figure 6:
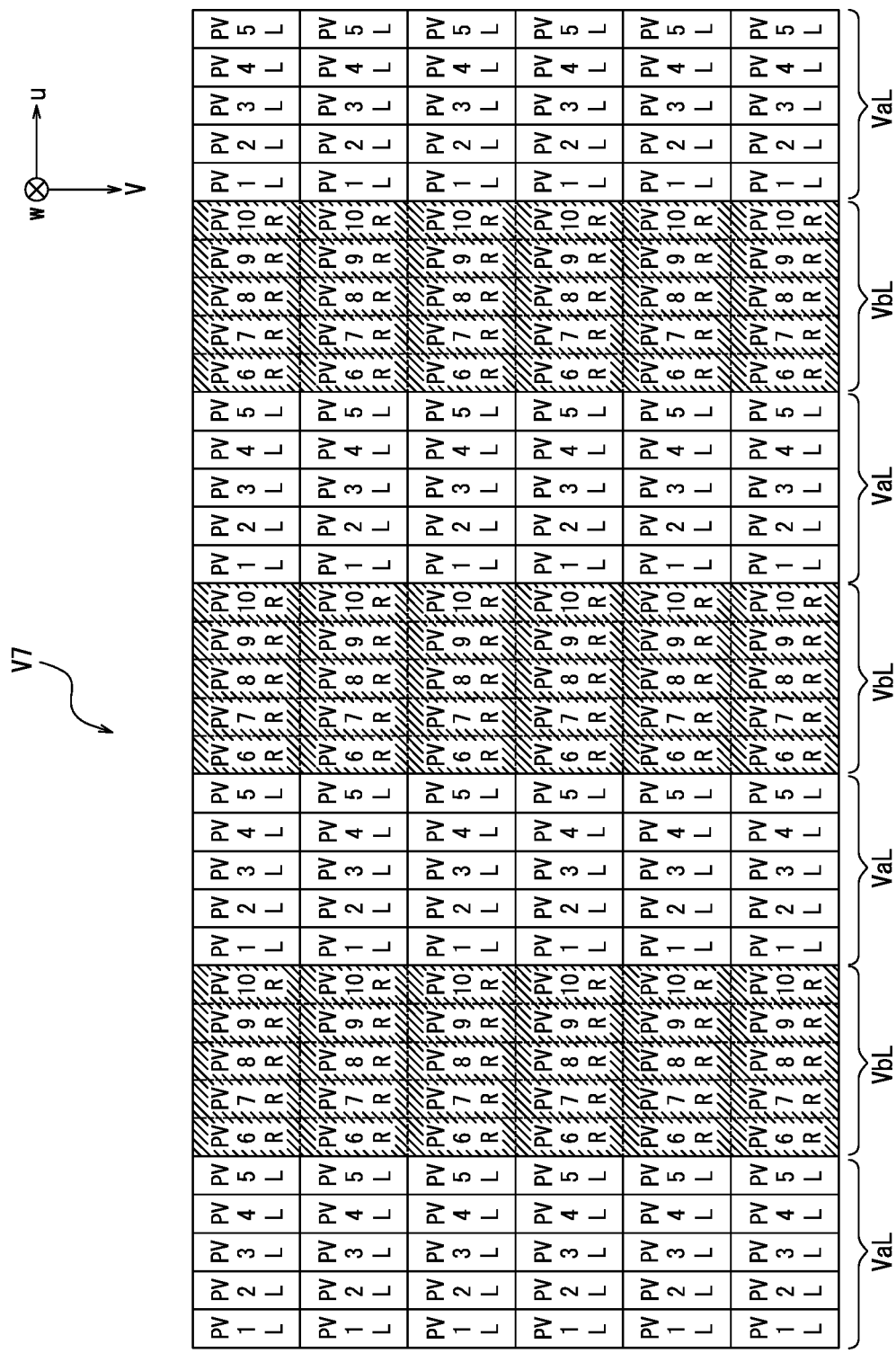
FIG. 6 is a diagram illustrating a left visible region on a virtual image plane illustrated in FIG. 5.
Figure 7:
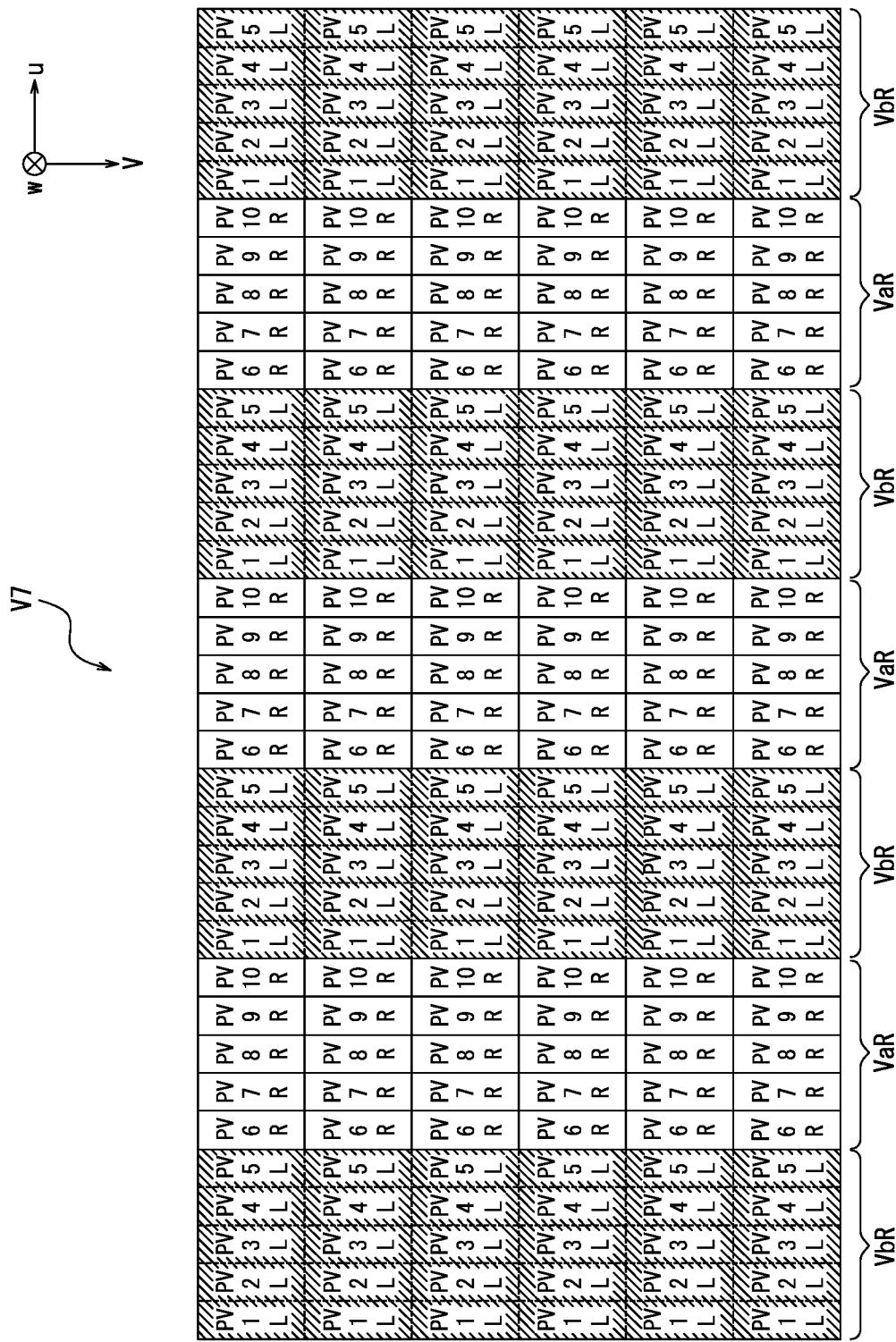
FIG. 7 is a diagram illustrating a right visible region on the virtual image plane illustrated in FIG. 5.

By the above-described configuration, the parallax barrier 8 is configured to allow part of the image light emitted from a part of the sub-pixels of the active area 71 to be transmitted through the light-transmitting region 81, and to allow the part of the image light transmitted therethrough to be propagated to the left eye of the user. The parallax barrier 8 is configured to allow part of the image light emitted from a part of other sub-pixels to be transmitted through the light-transmitting region 81, and to allow the part of the image light transmitted therethrough to be propagated to the right eye of the user. The image that is visually recognized by the user's eyes by allowing the image light to be propagated to each of the left eye and the right eye of the user will be described in detail with reference to FIGS. 6 and 7. In FIGS. 6 and 7, the sub-pixel displaying the left eye image is denoted by a reference sign "L", and the sub-pixel displaying the right eye image is denoted by a reference sign "R".

As described above, a left visible region (a first visible region) VaL illustrated in FIG. 6 is an region of a virtual image plane V71 visually recognized by the left eye of the user by allowing part of the image light transmitted through the light-transmitting region 81 of the parallax barrier 8 to reach the left eye of the user. A left light-shielding region VbL is a region which is difficult to be visually recognized by the left eye of the user by allowing the image light to be dimmed by the dimming region 82 of the parallax barrier 8. In the example illustrated in FIG. 6, the left visible region VaL includes virtual image sub-pixels VP1 to VP5. The left light-shielding region VbL includes virtual image sub-pixels VP6 to VP10. The virtual image sub-pixels VP1 to VP10 are virtual images of the images displayed in the sub-pixels P1 to P10 arranged in the active area 71, respectively. The left visible region VaL and the left light-shielding region VbL can be determined by a relationship between an optimum viewing distance d, an inter-eye distance E of the user, a pitch Bpv of the second virtual image V8, a virtual image gap gv, and an image pitch kv of the first virtual image V7 that are illustrated in FIG. 5. The virtual image gap gv is a distance gv between the second virtual image V8 and the first virtual image V7. The optimum viewing distance d is a distance between the second virtual image V8 and the user's eyes. The image pitch kv of the first virtual image V7 is a length corresponding to the image pitch k on the virtual image plane V71.

A right visible region (a second visible region) VaR illustrated in FIG. 7 is a region of the virtual image plane V71 visually recognized by the right eye of the user by allowing part of the image light from a part of other sub-pixels transmitted through the light-transmitting region 81 of the parallax barrier 8 to reach the right eye of the user. A right light-shielding region VbR is a region which is difficult to be visually recognized by the right eye of the user by allowing the image light to be dimmed by the dimming region 82 of the parallax barrier 8. In the example illustrated in FIG. 7, the right visible region VaR includes virtual image sub-pixels VP6 to VP10. The right light-shielding region VbR includes virtual image sub-pixels VP1 to VP5. In the same manner as the left visible region VaL and the left light-shielding region VbL, the right visible region VaR and the right light-shielding region VbR can be determined by the relationship between the optimum viewing distance d, the inter-eye distance E of the user, the pitch Bpv of the second virtual image V8, the virtual image gap gv, and the image pitch kv of the first virtual image V7 that are illustrated in FIG. 5.

As such, the left eye of the user visually recognizes the virtual image of the left eye image in the left visible region VaL, and the right eye visually recognizes the virtual image of the right eye image in the right visible region VaR. As described above, since the right eye image and the left eye image are parallax images having parallax with each other, the user visually recognizes the virtual image of a three-dimensional image.

The controller 9 is connected to each component of the head-up display system 100, and is configured to be able to control each component thereof. The component controlled by the controller 9 includes the image capturing device 1 and the display panel 7. The controller 9 is configured as, for example, a processor. The controller 9 may include one or more processors. The processor may include a general-purpose processor that performs a specific function by reading a specific program, and a dedicated processor that is specialized for a specific process. The dedicated processor may include an application specific integrated circuit (ASIC). The processor may include a programmable logic device (PLD). The PLD may include an FPGA (Field-Programmable Gate Array). The controller 9 may be either one of a SoC (System-on-a-Chip) in which one or a plurality of processors cooperate with each other, and a SiP (System In a Package). The controller 9 includes a storage unit, and may be configured to store various pieces of information or a program for operating each component of the head-up display system 100 in the storage unit. The storage unit may be formed of, for example, a semiconductor memory. The storage unit may function as a work memory of the controller 9.

The memory 10 is formed of any storage device such as a RAM (Random Access Memory) and a ROM (Read Only Memory). The memory 10 is configured to store information received by the input unit 5 and information converted by the controller 9. For example, the memory 10 is configured to store the calibration position information, which will be described later, received by the input unit 5. For example, the memory 10 may be configured to store a conversion parameter, which will be described later, converted by the controller 9 as calibration information. For example, the memory 10 may be configured to store at least one of the first arrangement information, the second arrangement information, and the third arrangement information received by the input unit 5.

As described above, in order to allow the user to appropriately and visually recognize the virtual image of the three-dimensional image, the HUD 2 is required to allow the user to visually recognize each of the virtual image of the left eye image and the virtual image of the right eye image in the left visible region VaL and the right visible region VaR on the virtual image plane V71. As described above, the left visible region VaL and the right visible region VaR can be determined based on the optimum viewing distance d. The optimum viewing distance d can be calculated based on the virtual image gap gv and a distance from the virtual image plane V71 to the positions of the eyes. The virtual image gap gv is a distance between the first virtual image V7 and the second virtual image V8, and can be calculated by a relationship between the display panel 7, the parallax barrier 8, and the optical system 3. Therefore, in order to calculate the optimum viewing distance d, it is required to calculate the distance from the virtual image plane V71 to the positions of the eyes. Here, the controller 9 is configured to calculate the distance from the virtual image plane V71 to the positions of the eyes based on the positions of the eyes detected by the image capturing device 1.

Figure 8:
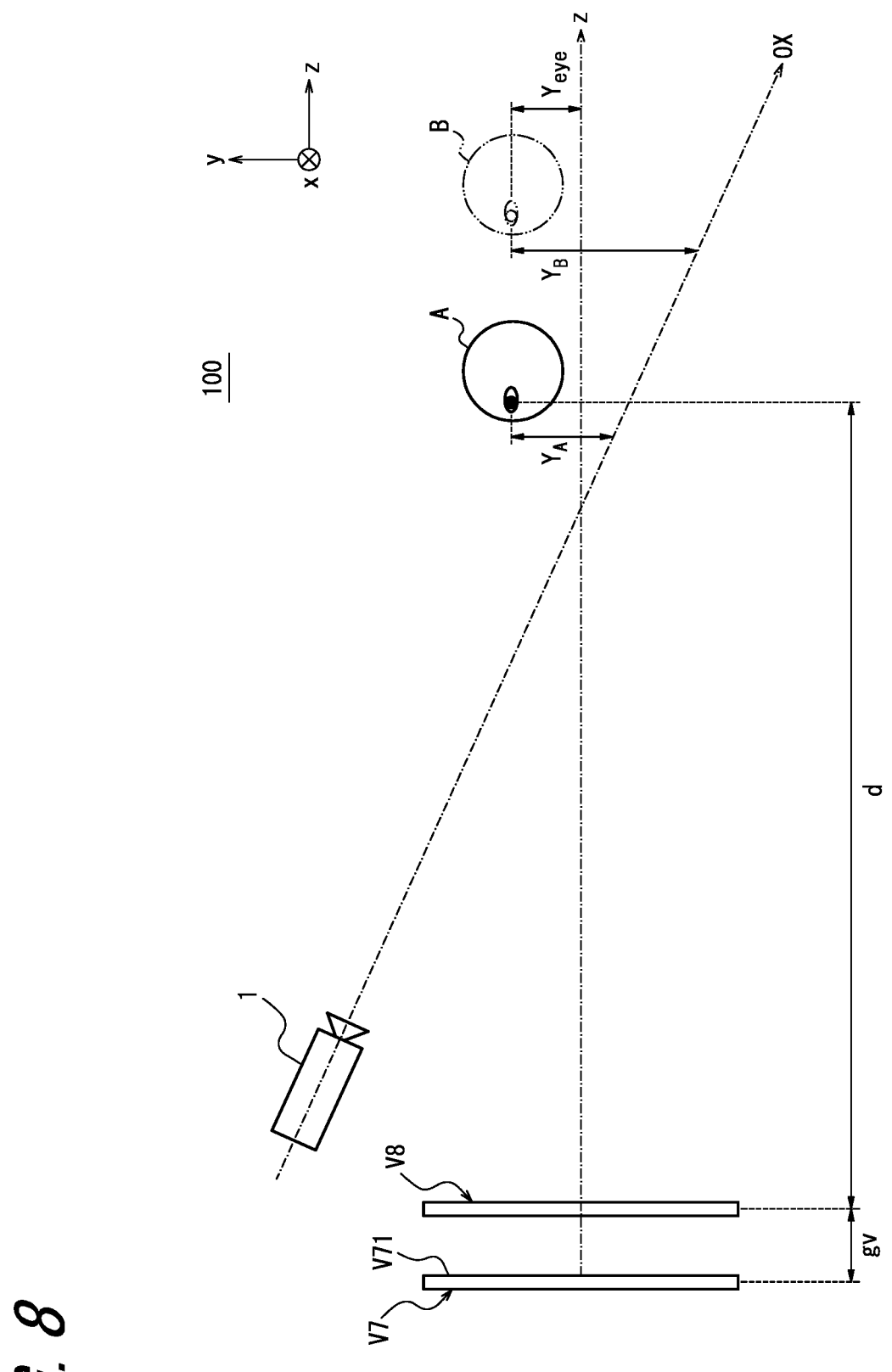
FIG. 8 is a diagram illustrating an example of a position relationship between the virtual image plane and an image capturing device when viewed from a horizontal direction.

The image capturing device 1 is arranged away from a light beam to the first virtual image V7 not to overlap a user's field of view. In order to allow the image capturing device 1 arranged away from the light beam to the first virtual image V7 to detect the user's face, a direction of the optical axis OX of the image capturing device 1 is not necessarily the same as a normal-line direction of the virtual image plane V71. For example, as illustrated in FIG. 8, the direction of the optical axis OX of the image capturing device 1 may deviate from the normal-line direction of the virtual image plane V71 to a tilt direction. For example, as illustrated in FIG. 9, the direction of the optical axis OX of the image capturing device 1 may deviate from the normal direction of the virtual image plane V71 in a pan direction.

Therefore, the controller 9 is configured to calculate coordinates of a second coordinate system based on the virtual image plane V71, based on the positions of the eyes in the first coordinate system based on the image capturing device 1. As illustrated in FIGS. 8 and 9, the second coordinate system is an orthogonal coordinate system based on the virtual image plane V71. Specifically, the second coordinate system is an orthogonal coordinate system in which a predetermined position on the virtual image plane V71 is defined as an origin and a normal-line direction of the image capturing device 1 is defined as a z-axis. The predetermined position may be, for example, a center of the virtual image plane V71. In the second coordinate system, one direction in the virtual image plane V71 is defined as an X direction. The x direction may be a direction along a straight line passing through the right eye and the left eye of the user. A direction orthogonal to the x direction in the virtual image plane V71 is defined as a y direction.

As illustrated in FIG. 8, a y coordinate $y_{eye}$ of the positions of the eyes in the second coordinate system does not change when the user's eyes are at a position A and when the user's eyes are at a position B displaced in the z direction from the position A. On the other hand, in a configuration in which the direction of the optical axis OX of the image capturing device 1 deviates from the z-axis of the second coordinate system in the tilt direction, a Y coordinate $Y_A$ of the positions of the eyes at the position A is different from a Y coordinate $Y_B$ of the positions of the eyes at the position B in the first coordinate system based on the image capturing device 1. Specifically, as the positions of the eyes moves away from an intersection of the optical axis OX and the z-axis in the z direction, a difference between the Y coordinate of the positions of the eyes in the first coordinate system and the y coordinate $y_{eye}$ in the second coordinate system is large.

Figure 9:
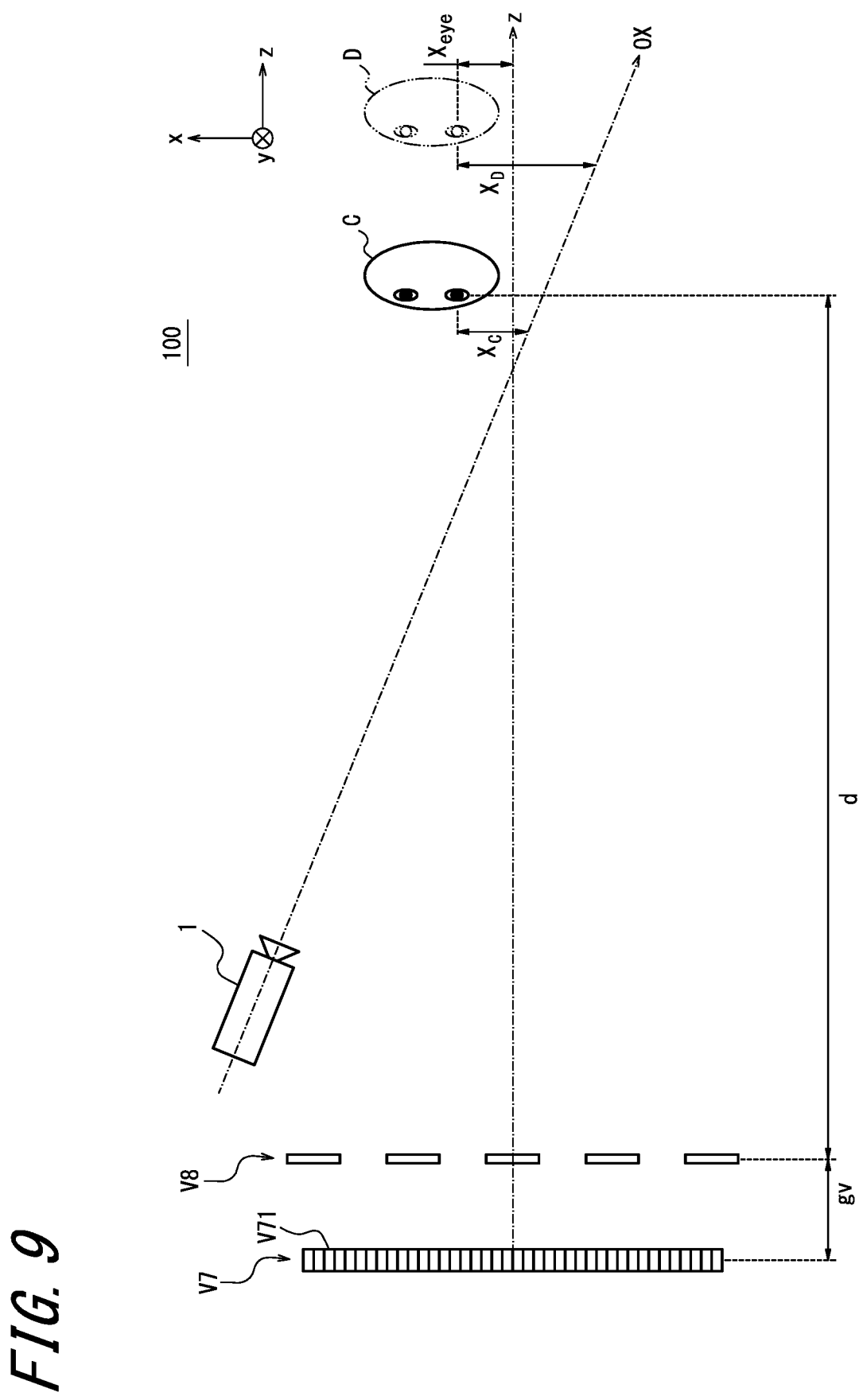
FIG. 9 is a diagram illustrating an example of a position relationship between the virtual image plane and the image capturing device when viewed from a vertical direction.

As illustrated in FIG. 9, when the user's eyes are at a position C and when the user's eyes are at a position D displaced in the z direction from the position C, an x coordinate $x_{eye}$ of the positions of the eyes in the second coordinate system does not change. On the other hand, in a configuration in which the direction of the optical axis OX of the image capturing device 1 deviates from the z-axis of the second coordinate system in the pan direction, an X coordinate $X_C$ of the positions of the eyes at the position C is different from an X coordinate $X_D$ of the positions of the eyes at the position D in the first coordinate system. Specifically, as the positions of the eyes moves away from an intersection of the optical axis OX and the z-axis in the z direction, a difference between the X coordinate of the positions of the eyes in the first coordinate system and the x coordinate $x_{eye}$ in the second coordinate system is large.

In order to correct the difference therebetween, the controller 9, in an initial setting mode, is configured to determine the conversion parameter for converting the first position information into the second position information by using a first calibration point CP1 and a second calibration point CP2 detected by the image capturing device 1. The first position information is information indicating the positions of the eyes detected by the image capturing device 1 in the first coordinate system. The second position information is information indicating the positions of the eyes in the second coordinate system. In a calibration mode, the controller 9 may be configured to determine the conversion parameter determined in the initial setting mode by changing the conversion parameter based on at least one arrangement (at least one of the position and the posture) of the display panel 7, the image capturing device 1, and the optical system 3. In a normal mode, the controller 9 is configured to convert the first position information indicating the positions of the eyes detected by the image capturing device 1 into the second position information by using the conversion parameter determined in the initial setting mode or the calibration mode.

Hereinafter, processes executed by the image capturing device 1 and the display device 4 in each of the initial setting mode, the normal mode, and the calibration mode will be described in detail.

<<Initial Setting Mode>>
<Determination of the Conversion Parameter with Respect to a y-Axis Direction>

Figure 10:
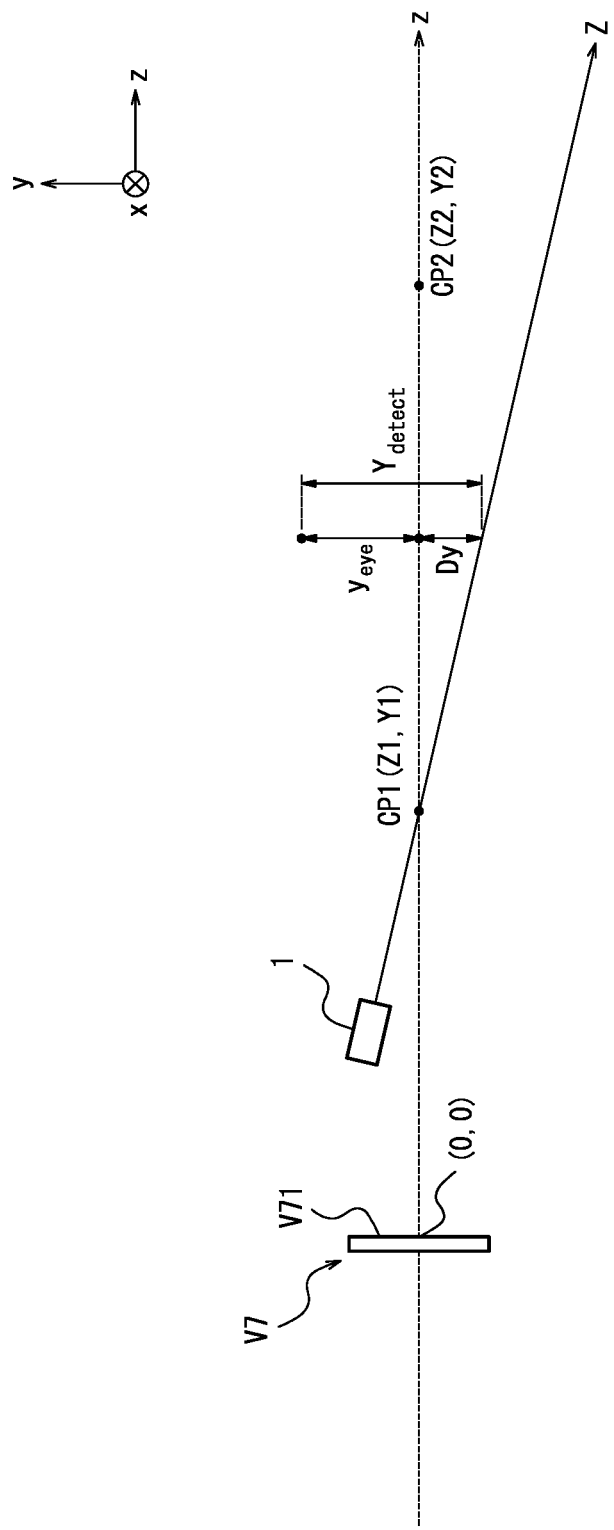
FIG. 10 is a diagram illustrating a conversion parameter for converting first position information in a y-axis direction into second position information.

As illustrated in FIG. 10, the image capturing device 1 is configured to detect the respective positions of the first calibration point CP1 and the second calibration point CP2 in the first coordinate system. The first calibration point CP1 is any point on the z-axis in the second coordinate system. In the example illustrated in FIG. 10, a Y coordinate Y1 of the first calibration point CP1 is 0. The second calibration point CP2 is a point different from the first calibration point CP1 on the z-axis in the second coordinate system. For example, the image capturing device 1 is configured to be able to detect a Z coordinate and a Y coordinate indicating a position of the first calibration point CP1 in the first coordinate system by detecting a calibration object arranged in the first calibration point CP1 by a calibration operator. For example, the image capturing device 1 is configured to be able to detect a Z coordinate and a Y coordinate indicating a position of the second calibration point CP2 in the first coordinate system by detecting a calibration object arranged in the second calibration point CP2 by the calibration operator. The image capturing device 1 is configured to output the calibration position information indicating the position of each of the detected first calibration point CP1 and the second calibration point CP2 in the first coordinate system to the display device 4.

The input unit 5 is configured to receive the calibration position information outputted from the image capturing device 1.

The controller 9 is configured to calculate an expression indicating the z-axis of the second coordinate system in the first coordinate system. Specifically, the controller 9 is configured to calculate an expression of a straight line in the first coordinate system passing through the first calibration point CP1 and the second calibration point CP2 received by the input unit 5. For example, when the coordinates of the first calibration point CP1 are (Z1, Y1) and the coordinates of the second calibration point CP2 are (Z2, Y2), the z-axis of the second coordinate system is represented by the following expression (1). The Y coordinate in the first coordinate system detected by the image capturing device 1 is a length from the Z-axis in a direction perpendicular to a Z-axis direction of the first coordinate system. When an angle formed by the Z-axis of the first coordinate system and the z-axis of the second coordinate system is small, the respective Y coordinates of the first calibration point CP1 and the second calibration point CP2 in the first coordinate system can be approximated to distances Y1 and Y2 from the Z-axis in the y-axis direction.

$$Y = \frac{Y2 - Y1}{Z2 - Z1}(Z - Z1) + Y1 \quad (1)$$

A y coordinate $y_{eye}$ of the positions of the eyes in the first coordinate system is represented by the following expression (2) by using a Y coordinate $Y_{detect}$ and a Z coordinate $Z_{detect}$ of the positions of the eyes detected by the image capturing device 1.

$$y_{eye} = -Dy + Y_{detect} \quad (2)$$

As described above, as the positions of the eyes moves away from the intersection of the optical axis OX and the z-axis in the z direction, a difference Dy from the y coordinate $y_{eye}$ of the second coordinate system in the Y coordinate $Y_{detect}$ of the positions of the eyes in the first coordinate system becomes large. The difference Dy is represented by the following expression (3) by using the expression (1) of the straight line indicating the Z-axis of the first coordinate system.

$$Dy = \frac{Y2 - Y1}{Z2 - Z1}(Z_{detect} - Z1) + Y1 \quad (3)$$

Therefore, the controller 9 is configured to determine that the y coordinate $y_{eye}$ of the positions of the eyes in the first coordinate system is represented by the following expression (4) based on expressions (2) and (3). That is, the controller 9 is configured to determine the conversion parameter for converting the first position information represented by the Y coordinate $Y_{detect}$ and the Z coordinate $Z_{detect}$ into the second position information represented by the y coordinate $y_{eye}$. As illustrated in FIG. 10, when a point positioned on the Z-axis of the first coordinate system is used as the first calibration point CP1, offset Y1 in expression (4) can be set to 0.

$$y_{eye} = -\frac{Y2 - Y1}{Z2 - Z1}(Z_{detect} - Z1) - Y1 + Y_{detect} \quad (4)$$

<Determination of the Conversion Parameter with Respect to an x-Axis Direction>

Figure 11:
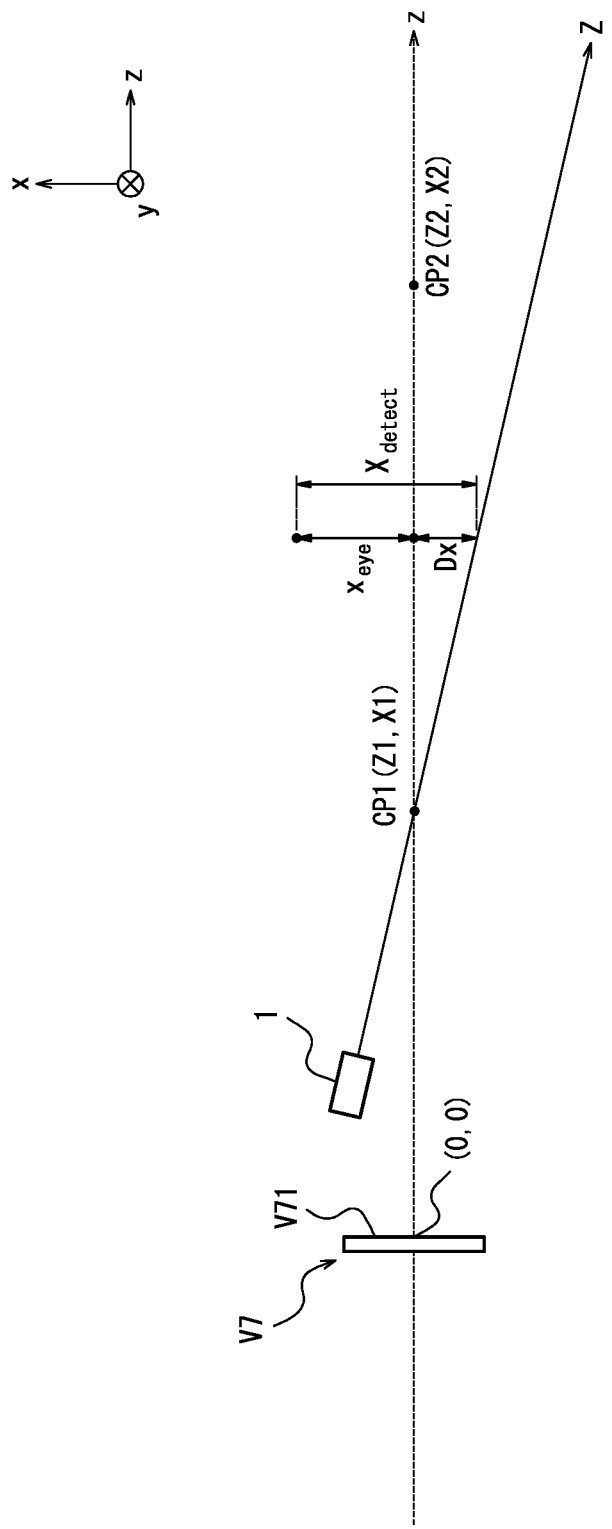
FIG. 11 is a diagram illustrating a conversion parameter for converting the first position information in an x-axis direction into the second position information.

As illustrated in FIG. 11, the image capturing device 1 detects the respective coordinates of the first calibration point CP1 and the second calibration point CP2 in the second coordinate system. For example, the image capturing device 1 is configured to be able to detect a Z coordinate Z1 and an X coordinate X1 of the first calibration point CP1 by detecting a calibration object arranged at the first calibration point CP1 by the calibration operator. In the example illustrated in FIG. 11, the X coordinate X1 of the first calibration point CP1 is 0. For example, the image capturing device 1 is configured to be able to detect a Z coordinate Z2 and an X coordinate X2 of the second calibration point CP2 by detecting a calibration object arranged at the second calibration point CP2 by the calibration operator. The image capturing device 1 is configured to output the calibration position information indicating the respective coordinates of the detected first calibration point CP1 and the second calibration point CP2 to the display device 4.

The input unit 5 is configured to receive the calibration position information outputted from the image capturing device 1.

The controller 9 is configured to calculate an expression indicating the z-axis of the first coordinate system in the second coordinate system. Specifically, the controller 9 is configured to calculate the expression of the straight line passing through the first calibration point CP1 and the second calibration point CP2 in the first coordinate system, based on the coordinates of the first calibration point CP1 and the second calibration point CP2 indicated by the calibration position information received by the input unit 5. For example, when the coordinates of the first calibration point CP1 are (Z1, X1) and the coordinates of the second calibration point CP2 are (Z2, X2), the following expression (5) is represented. The X coordinate in the first coordinate system detected by the image capturing device 1 is a length from the Z-axis in a direction perpendicular to the Z-axis direction of the first coordinate system. When an angle formed by the Z-axis of the first coordinate system and the Z-axis of the second coordinate system is small, the respective X coordinates of the first calibration point CP1 and the second calibration point CP2 in the first coordinate system can be approximated to distances X1 and X2 from the Z-axis in the x-axis direction.

$$X = \frac{X2 - X1}{Z2 - Z1}(Z - Z1) + X1 \tag{5}$$

The x coordinate $x_{eye}$ of the positions of the eyes in the first coordinate system is represented by the following expression (6) by using the X coordinate $X_{detect}$ and the Z coordinate $Z_{detect}$ of the second coordinate system detected by the imaging capturing device 1.

$$X_{eye} = -Dx + X_{detect} \tag{6}$$

As described above, as the positions of the eyes moves away from the intersection of the optical axis OX and the z-axis in the z direction, a difference Dx from the x coordinate $x_{eye}$ of the second coordinate system in the X coordinate $X_{detect}$ of the positions of the eyes in the first coordinate system becomes large. The difference Dx is represented by the following expression (7) by using the expression (5) of the straight line indicating the Z-axis of the first coordinate system.

$$Dx = \frac{X2 - X1}{Z2 - Z1}(Z_{detect} - Z1) + X1 \tag{7}$$

Therefore, the controller 9 determines that the y coordinate $y_{eye}$ of the positions of the eyes in the first coordinate system is represented by the following expression (8) based on expressions (6) and (7). That is, the controller 9 determines the conversion parameter for converting the first position information represented by the X coordinate $X_{detect}$ and the Z coordinate $Z_{detect}$ into the second position information represented by the x coordinate $x_{eye}$. When a point positioned on the Z axis of the first coordinate system is used as the first calibration point CP1, offset X1 can be set to 0 when calculating the y coordinate $y_{eye}$.

$$x_{eye} = -\frac{X2 - X1}{Z2 - Z1}(Z_{detect} - Z1) - X1 + X_{detect} \tag{8}$$

<<Calibration Mode>>

As described above, the image capturing device 1 may be mounted on a rearview mirror of the mobile body 20. In such a configuration, when at least one of a position and a posture of the rearview mirror changes, at least one of a position and a posture of the image capturing device 1 mounted on the rearview mirror changes. The first coordinate system changes when at least one of the position and the posture of the image capturing device 1 changes. As a result, a relative relationship between the first coordinate system and the second coordinate system changes.

Here, during the initial setting or the calibration, the input unit 5 may be configured to receive the first arrangement information transmitted from a control device that controls at least one of the position and the posture of the image capturing device 1. The first arrangement information is information indicating at least one of the position and the posture of the image capturing device 1. The memory 10 stores the first arrangement information received by the input unit 5. When at least one of the position and the posture of the image capturing device 1 changes, the input unit 5 may be configured to receive the first arrangement information indicating at least one of the position and the posture after the change of the image capturing device 1, which is transmitted from the control device that controls at least one of the position and the posture of the image capturing device 1.

The controller 9 may be configured to determine the conversion parameter based on a change in the first arrangement information. Specifically, the controller 9 may be configured to determine the conversion parameter based on a change between the first arrangement information received by the input unit 5 and the first arrangement information received by the input unit 5 last time and stored in the memory 10. For example, the controller 9 may be configured to determine the conversion parameter by using a relationship between the change in the first arrangement information stored in the memory 10 in advance and a correction amount of the conversion parameter. The controller 9 may be configured to determine the conversion parameter by using a predetermined conversion rule based on the change in the first arrangement information.

The controller 9 may be configured to determine the conversion parameter based on newly received first arrangement information. Specifically, when the first arrangement information received by the input unit 5 is different from the first arrangement information stored in the memory 10, the controller 9 may be configured to determine the conversion parameter based on the newly received first arrangement information.

Even in a configuration in which the image capturing device 1 is mounted on the cluster, the center panel, or the supporting portion of the steering wheel in the mobile body 20, the controller 9 may be configured to determine the conversion parameter in the same manner.

As described above, the display panel 7 that emits the image light and the optical system 3 that reflects the image light are arranged so that the image light reaches the user's eyes. The positions of the user's eyes may change depending on a sitting height of the user. Here, at least one of a position and a posture of the optical system 3 may be changed in order to allow the image light to appropriately reach the user's eyes. When at least one of the position and the posture of the optical system 3 changes, at least one of a position and a posture of the virtual image plane V71 changes, and the first coordinate system changes. As a result, the relative relationship between the first coordinate system and the second coordinate system changes.

Here, during the initial setting or the calibration, the input unit 5 may be configured to receive the second arrangement information transmitted from the control device that changes at least one of the position and the posture of the optical system 3. The second arrangement information is information indicating at least one of the position and the posture of the optical system 3. The position and the posture of the optical system 3 indicates a position and a posture of the optical element 31 provided in the optical system 3. The memory 10 is configured to store the second arrangement information received by the input unit 5. When at least one of the position and the posture of the optical system 3 changes, the input unit 5 may be configured to receive the second arrangement information indicating at least one of the position and the posture after the change of the optical system 3, which is transmitted from the control device that controls at least one of the position and the posture of the optical system 3.

The controller 9 may be configured to determine the conversion parameter based on the change in the second arrangement information. Specifically, the controller 9 may be configured to determine the conversion parameter based on a change between the second arrangement information received by the input unit 5 and the second arrangement information received by the input unit 5 last time and stored in the memory 10. For example, the controller 9 may be configured to determine the conversion parameter by using a relationship between the change in the second arrangement information stored in the memory 10 in advance and a correction amount of the conversion parameter. The controller 9 may be configured to determine the conversion parameter by using a predetermined conversion rule based on the change in the second arrangement information.

The controller 9 may be configured to determine the conversion parameter based on newly received second arrangement information. Specifically, when the second arrangement information received by the input unit 5 is different from the second arrangement information stored in the memory 10, the controller 9 may be configured to determine the conversion parameter based on the newly received second arrangement information.

As described above, when the positions of the user's eyes change depending on the sitting height of the user, at least one of a position and a posture of the display panel 7 may be changed in order to allow the image light to reach the user's eyes. When at least one of the position and the posture of the display panel 7 changes, the position and the posture of the virtual image plane V71 change, and the second coordinate system changes. As a result, the relative relationship between the first coordinate system and the second coordinate system changes.

Here, during the initial setting or the calibration, the input unit 5 may be configured to receive the third arrangement information transmitted from the control device that controls at least one of the position and the posture of the display panel 7. The third arrangement information is information indicating at least one of the position and the posture of the display panel 7. The memory 10 is configured to store the third arrangement information received by the input unit 5. When at least one of the position and the posture of the display panel 7 changes, the input unit 5 may be configured to receive the third arrangement information indicating at least one of the position and the posture after the change of the display panel 7, which is transmitted from the control device that controls at least one of the position and the posture of the display panel 7.

The controller 9 may be configured to determine the conversion parameter based on the change in the third arrangement information. Specifically, the controller 9 may be configured to determine the conversion parameter based on a change between the third arrangement information received by the input unit 5 and the third arrangement information received by the input unit 5 last time and stored in the memory 10. For example, the controller 9 may be configured to determine the conversion parameter by using a relationship between the change in the third arrangement information stored in the memory 10 in advance and a correction amount of the conversion parameter. The controller 9 may be configured to determine the conversion parameter by using a predetermined conversion rule based on the change in the third arrangement information.

The controller 9 may be configured to determine the conversion parameter based on newly received third arrangement information. Specifically, when the third arrangement information received by the input unit 5 is different from the third arrangement information stored in the memory 10, the controller 9 may be configured to determine the conversion parameter based on the newly received third arrangement information.

<<Normal Mode>>

<Calculation of the Positions of the Eyes in the y-Axis Direction>

In the normal mode, the image capturing device 1 is configured to detect the positions of the user's eyes by a well-known method. Specifically, the image capturing device 1 is configured to detect the Y coordinate $Y_{detect}$ and the Z coordinate $Z_{detect}$ indicating the positions of the user's eyes in the first coordinate system. The image capturing device 1 is configured to output the first position information including the Y coordinate $Y_{detect}$ and the Z coordinate $Z_{detect}$ to the display device 4. When the input unit 5 of the display device 4 receives the first position information, the controller 9 is configured to convert the first position information into the second position information by calculating the y coordinate $y_{eye}$ by using expression (4), based on the Y coordinate $Y_{detect}$ and the Z coordinate $Z_{detect}$ included in the first position information.

<Calculation of the Positions of the Eyes in the x-Axis Direction>

In the normal mode, the image capturing device 1 is configured to detect the positions of the user's eyes by a well-known method. Specifically, the image capturing device 1 is configured to detect the X coordinate $X_{detect}$ and the Z coordinate $Z_{detect}$ indicating the positions of the user's eyes in the first coordinate system. The image capturing device 1 is configured to output the first position information including the X coordinate $X_{detect}$ and the Z coordinate $Z_{detect}$ to the display device 4. When the input unit 5 of the display device 4 receives the first position information, the controller 9 is configured to convert the first position information into the second position information by calculating the x coordinate $x_{eye}$ by using expression (8), based on the X coordinate $X_{detect}$ and the Z coordinate $Z_{detect}$ included in the first position information.

As described above, in the embodiment, the HUD 2 is configured to convert the first position information into the second position information by using the calibration position information. Therefore, the display device 4 can control the image to be displayed on the display panel 7 based on the positions of the eyes based on the virtual image plane V71. Therefore, the HUD 2 can allow the user to visually recognize the virtual image, appropriately.

In the embodiment, the HUD 2 is configured to determine the conversion parameter based on at least one change in the position and the posture of the image capturing device 1. Therefore, even though the relationship between the first coordinate system and the second coordinate system changes due to the change in at least one of the position and the posture of the image capturing device 1, the conversion parameter can be appropriately determined. Therefore, the HUD 2 can control the image to be displayed on the display panel 7 based on the positions of the eyes based on the virtual image plane V71. Therefore, the HUD 2 can allow the user to visually recognize the virtual image, appropriately.

In the embodiment, the HUD 2 is configured to determine the conversion parameter based on at least one change in the position and the posture of the optical system 3. Therefore, even though the relationship between the first coordinate system and the second coordinate system changes due to the change in at least one of the position and the posture of the optical system 3, the conversion parameter can be appropriately determined. Therefore, the HUD 2 can appropriately acquire the positions of the eyes based on the virtual image plane V71, and control the image to be displayed on the display panel 7 based on the positions of the eyes. Therefore, the HUD 2 can allow the user to visually recognize the virtual image, appropriately.

In the embodiment, the HUD 2 is configured to determine the conversion parameter based on at least one change in the position and the posture of the display panel 7. Therefore, even though at least one of the position and the posture of the display panel 7 changes, and at least one of the position and the posture of the virtual image plane V71 changes such that the relationship between the first coordinate system and the second coordinate system changes, the conversion parameter can be appropriately determined. Therefore, the HUD 2 can appropriately acquire the positions of the eyes based on the virtual image plane V71, and control the image to be displayed on the display panel 7 based on the positions of the eyes. Therefore, the HUD 2 can allow the user to visually recognize the virtual image, appropriately.

Figure 12:
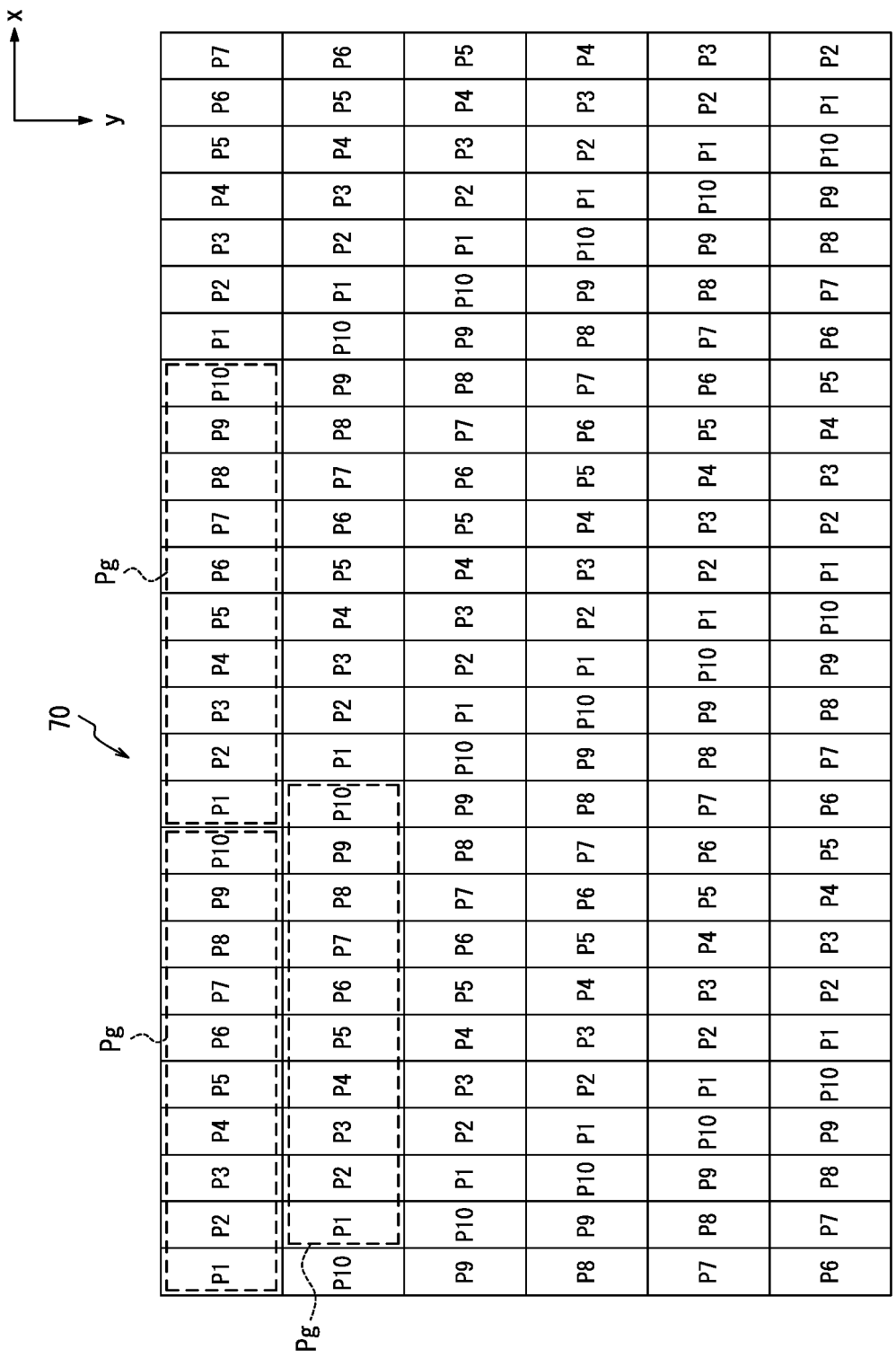
FIG. 12 is a diagram in which a modification of the display panel illustrated in FIG. 3 is viewed from the depth direction.

In the above-described embodiment, the display device 4 includes the display panel 7 in which the sub-pixel group Pg is repeatedly arranged in the horizontal direction and also repeatedly arranged in the vertical direction. For example, as illustrated in FIG. 12, the display device 4 may include a display panel 70 in which the sub-pixel group Pg is repeatedly arranged in the horizontal direction, and the sub-pixel group Pg, in the vertical direction, is repeatedly arranged adjacent to a position deviating by one sub-pixel in the horizontal direction.

Figure 13:
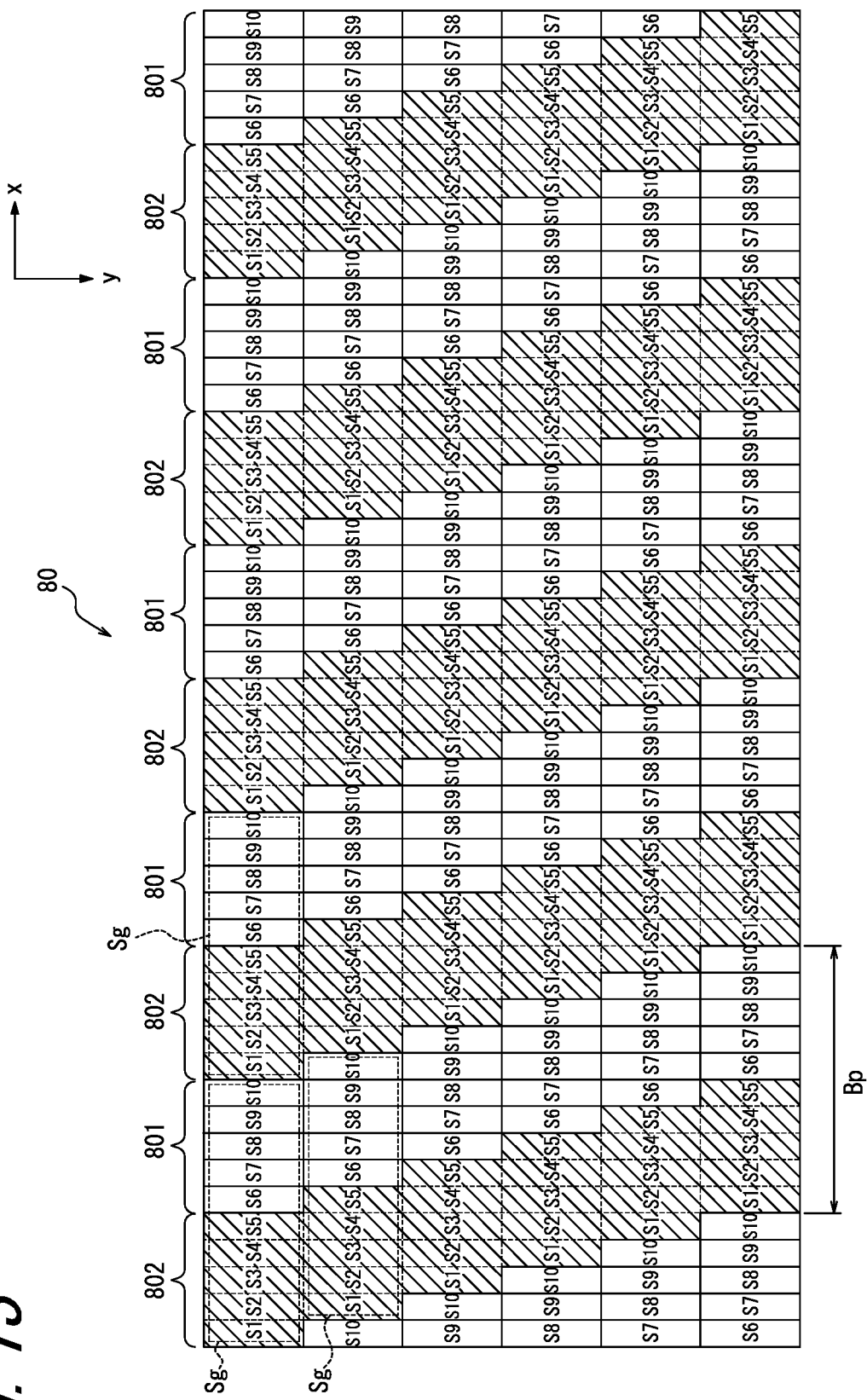
FIG. 13 is a diagram in which a modification of the parallax barrier illustrated in FIG. 4 is viewed from the depth direction.

In a configuration in which the display device 4 includes the display panel 70, the display device 4 includes a parallax barrier 80 instead of the parallax barrier 8. As illustrated in FIG. 13, the parallax barrier 80 is formed of a plurality of barrier region groups sg. The barrier region group sg is repeatedly arranged in the horizontal direction. The barrier region group sg, in the vertical direction, is configured to be repeatedly arranged adjacent to a position deviating by one barrier region in the horizontal direction. The barrier region group sg includes (2×n×b) pieces of the barrier regions s1 to s(2×n×b) in which (b) pieces of the barrier region in the vertical direction and (2×n) pieces of the barrier regions in the horizontal direction are consecutively arranged, corresponding to the arrangement of sub-pixels of the sub-pixel group Pg. In FIG. 13, n is 5, b is 1, and a part of the barrier region groups sg is denoted by a reference sign. The barrier region group sg may be configured to include (2×n'×b') pieces of the barrier regions s1 to s(2×n'×b') in which b' pieces of the barrier regions in the vertical direction (b'≠b) and (2×n') pieces of the barrier regions in the horizontal direction (n'≠n) are consecutively arranged.

A part of the plurality of barrier regions s provided in the barrier region group sg forms a light-transmitting region 801 and the remaining part thereof forms a dimming region 802. The light-transmitting region 801 and the dimming region 802 are configured so that image light from a sub-pixel at a position corresponding to each of the plurality of sub-pixel groups Pg of the display panel 70 is simultaneously transmitted or dimmed.

By the above-described configuration, the parallax barrier 80 is configured to define a light beam direction which is a propagation direction of the image light emitted from the sub-pixel. Part of the image light emitted from a part of the sub-pixels in the active area A is transmitted through the light-transmitting region 801 and is propagated to the pupil of the left eye of the user. Part of the image light emitted from a part of other sub-pixels in the active area A is transmitted through the light-transmitting region 801 and is propagated to the pupil of the right eye of the user.

While the above-described embodiments have been described as representative examples, it is apparent to those skilled in the art that various modifications and substitutions can be made within the spirit and scope of the present invention. Therefore, the present invention should not be construed as being limited by the above-described embodiments, and various variations and modifications can be made without departing from the scope of the claims. For example, a plurality of configuration blocks described in the embodiment and the example can be combined into one, or one configuration block can be divided.

REFERENCE SIGNS LIST

1: Image capturing device
2: Head-up display
3: Optical system
4: Display device
5: Input unit
6: Irradiator
7, 70: Display panel
8, 80: Parallax barrier
9: Controller
10: Mobile body
31: Optical element
32: Optical member
71: Active area
V7: First virtual image
V8: Second virtual image
V71: Virtual image plane
VaL: Left visible region
VaR: Right visible region
VbL: Left light-shielding region
VbR: Right light-shielding region
81, 801: Light-transmitting region
82, 802: Dimming region
100: Head-up display system
s, s1 to s10: Barrier region
sg: Barrier region group

The invention claimed is:

1. A head-up display, comprising:
a display device comprising a display panel configured to display an image, a parallax barrier configured to define a light beam direction of the image light, the parallax barrier comprising a plurality of light transmitting regions and a plurality of light dimming regions, an input unit configured to receive first position information indicating positions of user's eyes in a first coordinate system based on an image capturing device, a memory configured to store calibration information, and a controller; and
an optical system configured to allow the user to visually recognize a first virtual image plane, which is a first virtual image of the image displayed on the display panel, by reflecting image light emitted corresponding to the image toward the user's eyes, a second virtual image of the parallax barrier being apparently formed by the optical system, the controller being configured to convert the first position information into second position information, when a direction of an optical axis of the image capturing device is different than a normal-line direction of the first virtual image plane, so as to calculate an optimum viewing distance in response to movement of the eyes along the normal-line direction, the second positional information indicating the positions of the eyes in a second coordinate system based on the first virtual image plane by using the calibration information, the first coordinate system being different than the second coordinate system, wherein the controller is configured to calculate, as the calibration information, a conversion parameter for converting the first position information into the second position information and store a calculated conversion parameter in the memory, the controller is configured to convert the first position information into the second position information by using the conversion parameter, the memory stores second arrangement information that is configured to indicate at least one of a position and a posture of the optical system, the input unit is configured to, when a change of at least one of the position and the posture of the image optical system occurs, receive second arrangement information after the change that indicates at least one of the position and the posture after the change of the optical system, the controller is configured to determine the conversion parameter based on a change between the second arrangement information after the change received by the input unit and the second arrangement information stored in the memory, and the controller is configured to control the display device to display the image to present the first virtual image based on the optimum viewing distance.

2. The head-up display according to claim 1, wherein the memory stores first arrangement information that is configured to indicate at least one of a position and a posture of the image capturing device, the input unit is configured to, when a change of at least one of the position and the posture of the image capturing device occurs, receive first arrangement information after the change that indicates at least one of the position and the posture after the change of the image capturing device, and the controller is configured to determine the conversion parameter based on a change between the first arrangement information after the change received by the input unit and the first arrangement information stored in the memory.

3. A head-up display, comprising:

a display device comprising a display panel configured to display an image, a parallax barrier configured to define a light beam direction of the image light, the parallax barrier comprising a plurality of light transmitting regions and a plurality of light dimming regions, an input unit configured to receive first position information indicating positions of user's eyes in a first coordinate system based on an image capturing device, a memory configured to store calibration information, and a controller; and an optical system configured to allow the user to visually recognize a first virtual image plane, which is a first virtual image of the image displayed on the display panel, by reflecting image light emitted corresponding to the image toward the user's eyes, a second virtual image of the parallax barrier being apparently formed by the optical system, the controller being configured to convert the first position information into second position information, when a direction of an optical axis of the image capturing device is different than a normal-line direction of the first virtual image plane, so as to calculate an optimum viewing distance in response to movement of the eyes along the normal-line direction, the second positional information indicating the positions of the eyes in a second coordinate system based on the first virtual image plane by using the calibration information, the first coordinate system being different than the second coordinate system, wherein the controller is configured to calculate, as the calibration information, a conversion parameter for converting the first position information into the second position information and store a calculated conversion parameter in the memory, the controller is configured to convert the first position information into the second position information by using the conversion parameter, the memory stores third arrangement information that is configured to indicate at least one of a position and a posture of the display panel, the input unit is configured to, when a change of at least one of the position and the posture of the display panel occurs, receive third arrangement information after the change that indicates at least one of the position and the posture after the change of the display panel, the controller is configured to determine the conversion parameter based on a change between the third arrangement information after the change received by the input unit and the third arrangement information stored in the memory, and the controller is configured to control the display device to display the image to present the first virtual image based on the optimum viewing distance.

4. The head-up display according to claim 3, wherein the memory stores first arrangement information that is configured to indicate at least one of a position and a posture of the image capturing device, the input unit is configured to, when a change of at least one of the position and the posture of the image capturing device occurs, receive first arrangement information after the change that indicates at least one of the position and the posture after the change of the image capturing device, and the controller is configured to determine the conversion parameter based on a change between the first arrangement information after the change received by the input unit and the first arrangement information stored in the memory.

5. A head-up display system, comprising:

an image capturing device configured to detect a position of a calibration object and positions of user's eyes; and a head-up display comprising a display device comprising a display panel configured to display an image, a parallax barrier configured to define a light beam direction of the image light, the parallax barrier comprising a plurality of light transmitting regions and a plurality of light dimming regions, an input unit configured to receive first position information indicating the positions of the user's eyes in a first coordinate system based on the image capturing device, a memory configured to store calibration information, and a controller, and an optical system configured to allow the user to visually recognize a first virtual image plane, which is a first virtual image of the image displayed on the display panel, by reflecting image light emitted corresponding to the image toward the user's eyes, a second virtual image of the parallax barrier being apparently formed by the optical system, the controller being configured to convert the first position information into second position information, when a direction of an optical axis of the image capturing device is different than a normal-line direction of the first virtual image plane, so as to calculate an optimum viewing distance in response to movement of the eyes along the normal-line direction, the second positional information indicating the positions of the eyes in a second coordinate system based on the first virtual image plane by using the calibration information, the first coordinate system being different than the second coordinate system, wherein the controller is configured to calculate, as the calibration information, a conversion parameter for converting the first position information into the second position information and store a calculated conversion parameter in the memory, the controller is configured to convert the first position information into the second position information by using the conversion parameter, the memory stores second arrangement information that is configured to indicate at least one of a position and a posture of the optical system, the input unit is configured to, when a change of at least one of the position and the posture of the image optical system occurs, receive second arrangement information after the change that indicates at least one of the position and the posture after the change of the optical system, the controller is configured to determine the conversion parameter based on a change between the second arrangement information after the change received by the input unit and the second arrangement information stored in the memory, and the controller is configured to control the display device to display the image to present the first virtual image based on the optimum viewing distance.

* * * * *